(12) United States Patent
Platonov et al.

(10) Patent No.: US 12,213,504 B1
(45) Date of Patent: Feb. 4, 2025

(54) SYSTEM TO FREEZE FOOD PRODUCTS

(71) Applicant: Revoltech Inc., Dover, DE (US)

(72) Inventors: Aleksei Platonov, Murmansk (RU); Vladimir Igoshev, Markham (CA)

(73) Assignee: Revoltech Inc., Dover, DE (US)

( * ) Notice: Subject to any disclaimer, the term of this patent is extended or adjusted under 35 U.S.C. 154(b) by 0 days.

(21) Appl. No.: 18/739,119

(22) Filed: Jun. 10, 2024

Related U.S. Application Data

(60) Provisional application No. 63/620,493, filed on Jan. 12, 2024.

(51) Int. Cl.
*A23L 3/36* (2006.01)
*A23L 3/32* (2006.01)

(52) U.S. Cl.
CPC .. *A23L 3/36* (2013.01); *A23L 3/32* (2013.01)

(58) Field of Classification Search
CPC .................................... A23L 3/36; A23L 3/32
USPC ............................................................ 62/62
See application file for complete search history.

(56) References Cited

U.S. PATENT DOCUMENTS

| | | | | |
|---|---|---|---|---|
| 3,935,321 A * | 1/1976 | Sakler | ...... | A23L 3/362 426/244 |
| 4,072,762 A * | 2/1978 | Rhodes | ...... | A21D 8/06 426/236 |
| 4,169,375 A * | 10/1979 | Suzuki | ...... | G01F 1/60 73/861.16 |
| 4,390,830 A * | 6/1983 | Laugesen | ...... | H02M 7/1557 323/237 |
| 4,437,868 A * | 3/1984 | Kuhlman | ...... | F24F 7/025 454/341 |
| 4,502,287 A * | 3/1985 | Hare | ...... | G08B 29/181 62/236 |

(Continued)

FOREIGN PATENT DOCUMENTS

| | | |
|---|---|---|
| AU | 2020103780 A4 | 2/2021 |
| CN | 111175700 A * | 5/2020 |

(Continued)

OTHER PUBLICATIONS

KR-20210088234-A, machine translation (Year: 2024).*

(Continued)

*Primary Examiner* — Eric S Ruppert
*Assistant Examiner* — Kirstin U Oswald
(74) *Attorney, Agent, or Firm* — MASCHOFF BRENNAN; Paul G. Johnson

(57) ABSTRACT

A method to freeze items includes placing an item to be frozen in a freeze chamber of a blast freezer and freezing the item. The method includes applying a pulsed electrostatic field to the item for one or more time intervals while freezing the item. The method may further include, in response to application of the pulsed electrostatic field to the item: alternately pulling charged particles within the item in opposing directions and alternately accumulating charges on a surface of the item opposite to the pulsed electrostatic field. The method may further include creating microscopic ultrasonic vibrations on the surface of the item in response to the alternate pulling and accumulating. The method may further include transmitting the microscopic ultrasonic vibrations internally into the item to inhibit formation of ice crystals within the item during the freezing.

18 Claims, 2 Drawing Sheets

(56) References Cited

U.S. PATENT DOCUMENTS

| | | | | |
|---|---|---|---|---|
| 5,999,774 | A | * | 12/1999 | Masuda ................ G03G 15/32 |
| | | | | 399/155 |
| 10,588,336 | B2 | | 3/2020 | Jun et al. |
| 2003/0068414 | A1 | | 4/2003 | Ito |
| 2009/0134248 | A1 | * | 5/2009 | Yamaguchi ............. B05B 5/057 |
| | | | | 239/132.3 |
| 2016/0302457 | A1 | * | 10/2016 | Jun ...................... A01N 1/0252 |
| 2017/0346346 | A1 | * | 11/2017 | Shimokawa ............ H02J 50/12 |
| 2021/0212347 | A1 | | 7/2021 | Zhang et al. |

FOREIGN PATENT DOCUMENTS

| | | | |
|---|---|---|---|
| CN | 211880139 U | * | 11/2020 |
| CN | 110671876 B | | 10/2023 |
| CN | 116941722 A | | 10/2023 |
| CN | 116941723 A | | 10/2023 |
| JP | S58-141769 A | | 8/1983 |
| JP | 2016-192925 A | | 11/2016 |
| KR | 10-2018-0064719 A | | 6/2018 |
| KR | 20210088234 A | * | 7/2021 |
| WO | 2023075645 A1 | | 5/2023 |

OTHER PUBLICATIONS

CN-211880139-U, machine translation (Year: 2024).*
CN 111175700 A, machine translation (Year: 2024).*
Peng et al., "The application of electrostatic field technology for the preservation of perishable foods", Food Science and Technology, 43, e121722, 2023, 12 pgs.
International Search Report and Written Opinion, as issued in connection with International Patent Application No. PCT/US2024/045827, dated Oct. 1, 2024, 11 pgs.

* cited by examiner

SYSTEM TO FREEZE FOOD PRODUCTS

CROSS-REFERENCE TO RELATED APPLICATION

This application claims the benefit of and priority to U.S. Provisional App. No. 63/620,493 filed on Jan. 12, 2024. The 63/620,493 application is incorporated herein by reference in its entirety.

FIELD

The embodiments discussed herein relate to refrigeration technology, namely, to methods and systems to freeze food products and improve their quality.

BACKGROUND

Unless otherwise indicated, the materials described herein are not prior art to the claims in the present application and are not admitted to be prior art by inclusion in this section.

For many decades, efforts to optimize the processes of freezing objects of organic and inorganic origin have been aimed at reducing the size of water crystals formed during freezing up to preventing their formation. The difference in the densities of water and ice explains the destructive effect of crystallization on the internal structures of biological objects and products of organic and inorganic origin when their temperatures drop below the phase transition temperatures of water in the free and bound states. Water crystals formed inside cells and in the suspension of the intercellular space create mechanical tension due to an increase in the internal volume. The processes of inevitable accretion of primary crystals and their further growth (due to dehydration of tissues adjacent to the crystals) lead to complete or partial mechanical destruction of cellular and intercellular structures. At the same time, the concentrations of dissolved substances increase, and the effect of these concentrations on the product matrix during storage leads to protein denaturation, oxidation fats, the destruction of carbohydrates, vitamins and, accordingly, to the degradation of the organoleptic properties of the original product.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a method to freeze items includes placing an item to be frozen in a freeze chamber of a blast freezer. The method includes freezing the item in the freeze chamber. The method includes applying a pulsed electrostatic field to the item for one or more time intervals while freezing the item in the freeze chamber.

In another example embodiment, a method to freeze items includes freezing an item in a freeze chamber of a blast freezer. The method includes applying a pulsed electrostatic field to the item for one or more time intervals while freezing the item in the freeze chamber. The method includes, in response to application of the pulsed electrostatic field to the item: alternately pulling positively charged particles within the item in a first direction and a second direction opposite to the first direction; alternately pulling negatively charged particles within the item in the second direction and the first direction; and alternately accumulating charges on a surface of the item opposite to the pulsed electrostatic field. The method includes creating microscopic ultrasonic vibrations on the surface of the item in response to the alternate pulling and accumulating. The method includes transmitting the microscopic ultrasonic vibrations internally into the item to inhibit formation of ice crystals within the item during the freezing.

In another example embodiment, a system to freeze food products includes a control unit, a power supply unit, a high voltage converter, a signal generator, a field detector, and an electrostatic module. The power supply unit is connected to the control unit. The high voltage converter is connected to the control unit and the power supply unit. The signal generator is connected to the control unit and the high voltage converter. The electrostatic module is configured to apply a pulsed electrostatic field to food products. The electrostatic module includes one or more induction coils mounted to a radiator plate of one or more emitters.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION OF EXAMPLE EMBODIMENTS

Some embodiments herein apply a pulsed electrostatic field during a freezing process to items being frozen, such as to food products. The pulsed electrostatic field may create vibrations in the items that destroy water crystals that grow during the freezing process, thereby preventing destruction of cells and/or other structure of the items during the freezing process. The application of the pulsed electrostatic field may also accelerate the freezing process due to, e.g., increased heat exchange.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Figure 1:
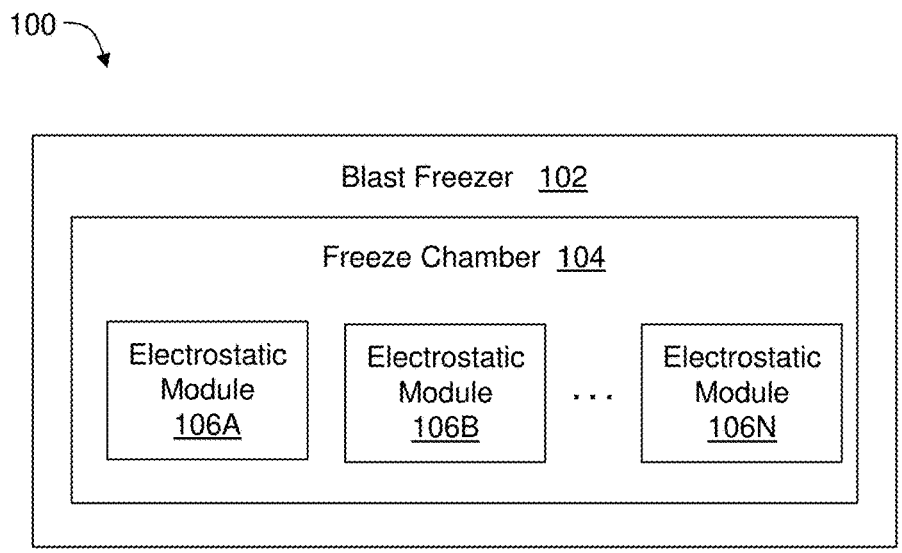
FIG. 1 is a block diagram of an example operating environment that includes a blast freezer.

FIG. 1 is a block diagram of an example operating environment 100 that includes a blast freezer 102, arranged in accordance with at least one embodiment herein. The blast freezer 102, which may alternately be referred to as a shock freezer, includes a freeze chamber 104 within which one or more electrostatic modules 106A, 106B, 106N (hereinafter generically "module 106" or collectively "modules 106") are disposed. The operating environment 100 may include other components, devices, and/or systems such as described with respect to FIG. 3.

In general, the blast freezer 102 is configured to rapidly freeze items placed within the freeze chamber 104, such as food products, biological samples, or the like. In some embodiments, the blast freezer 102 may be configured to freeze one or more items placed therein within 2 hours or less. In addition, and as explained in more detail below, a pulsed electrostatic field is applied to the items during the freeze process. The electrostatic field may ionize bacteria in or on the items, thereby killing the bacteria. The ionizing effect of the electrostatic field may alternatively or additionally kill mold in or on the items. In some embodiments, ionization may produce ozone and negative ions. The negative ions may extend a storage period (e.g., shelf life) of the items after defrosting.

In a conventional freeze process (whether using a conventional blast freezer or any other freeze method), water crystals (e.g., ice crystals) form and grow in items that include water, such as many food products, which can lead to the destruction of cells and disruptions to the structure of the items. For food products, the destruction of cells and disruptions to the structure lead to changes in organoleptic properties of the food products. The organoleptic properties include, e.g., taste, color, smell, and consistency of the food products. Some embodiments herein implement one or more of the modules 106 to reduce and/or prevent destruction of cells and disruptions to structure (and thereby preserve organoleptic properties of food products). In some embodiments herein, organoleptic properties such as original flavor and nutrients may be preserved by reducing a size of water crystals that are formed in items and/or due to an impact of application of an electrostatic field to the items. In particular, application of the electrostatic field to the items may have a similar effect to sterilization. For instance, application of the electrostatic field may change a binding state of water molecules and active enzymes, slowing down the enzyme active state.

Each of the modules 106 is configured to apply a pulsed high potential electrostatic field to one or more items on or proximate to the module 106. In some embodiments, the pulsed electric field with electrostatic potential is carried out in the range from 1 kilovolt (kV) to 50 kV, and/or with one or more of a frequency (e.g., a pulse frequency where each pulse includes a positive electrostatic field followed by a negative electrostatic field (or vice versa)) from 90 hertz (Hz) to 10,000 kilohertz (kHz), a periodicity (e.g., the interval at which the pulsed electrostatic field is applied) from 0.05 seconds to 10 seconds (equivalent to an application frequency of 0.1 hertz (Hz) to 20 Hz), and/or a duration of exposure (e.g., the duration during the interval during which the pulsed electrostatic field is applied) from 10 microseconds (μs) to 5 seconds(s).

In general, the electrostatic field pulls negatively-charged particles within the items towards a positive pole of the electrostatic field and positively-charged particles within the items towards a negative pole of the electrostatic field. In addition, items may contain water molecules which may render the item a partial conductor. Therefore, applying an electrostatic field to the item, e.g., the partial conductor, leads to accumulation of charges opposite to the electrostatic field on the surface of the item.

Figure 2A:
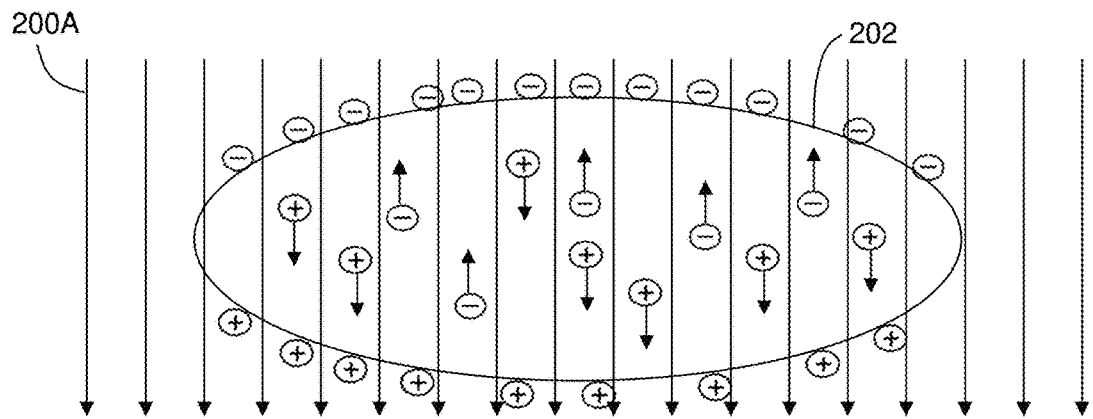
FIGS. 2A and 2B illustrate an electrostatic field applied to an item to be frozen in the blast freezer of FIG. 1.
Figure 2B:
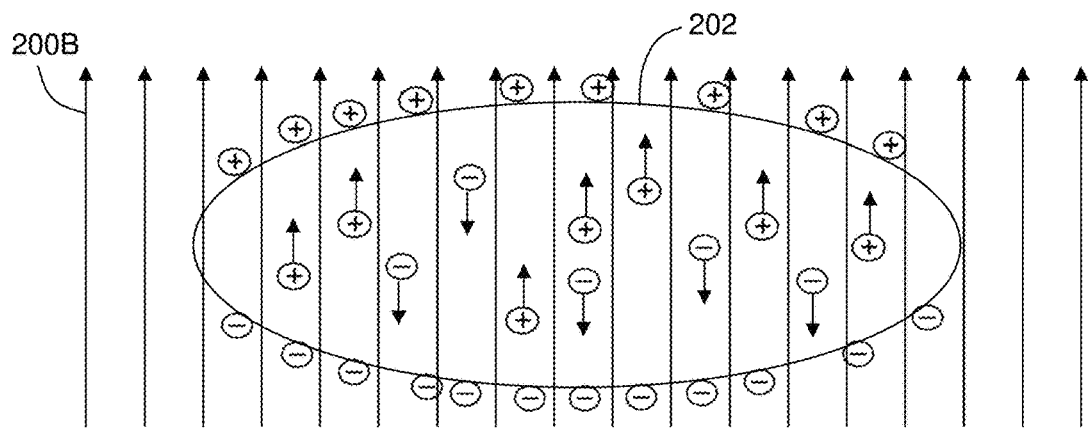

Consistent with the foregoing, FIGS. 2A and 2B illustrate an electrostatic field 200A, 200B applied to an item 202 to be frozen in the blast freezer 102, arranged in accordance with at least one embodiment herein. As illustrated, negatively-charged particles internal to the item 202 are pulled towards a positive pole of the electrostatic field 200A, 200B (i.e., upward in FIG. 2A and downward in FIG. 2B) while positively-charged particles internal to the item 202 are pulled towards a negative pole of the electrostatic field 200A, 200B (i.e., downward in FIG. 2A and upward in FIG. 2B). In addition, negative and positive charges accumulate on the surface of the item 202 opposite to the electrostatic field, i.e., with negative charges on an upper surface of the item 202 in FIG. 2A and lower surface of the item 202 in FIG. 2B and positive charges on a lower surface of the item 202 in FIG. 2A and upper surface of the item 202 in FIG. 2B.

In FIGS. 2A and 2B, the position of the item 202 remains unchanged and it is the direction of the electrostatic field 200A or 200B that is different between FIGS. 2A and 2B. Together, the electrostatic fields 200A, 200B of FIGS. 2A, 2B may be alternated as a pulsed electrostatic field. In a pulsed electrostatic field, the direction of the electrostatic field alternates between two opposing directions (e.g., downward in FIG. 2A and upward in FIG. 2B). For example, a pulsed electrostatic field may be implemented by applying the electrostatic field 200A of FIG. 2A, followed by applying the electrostatic field 200B of FIG. 2B, and then repeating. The magnitude of the electrostatic field may remain the same or it may change as the direction changes.

In some embodiments, a pulse effect of the pulsed electrostatic field may create microscopic ultrasonic vibrations on the surface of the item 202. The vibrations may be transmitted internally, leading to destruction of water crystals that grow in the item 202 during the freezing process. Destruction of the water crystals prevents (or at least reduces) the destruction of cells or other structure in the item 202 that occurs in other conventional freezing processes. Accordingly, embodiments herein may beneficially preserve an energy value and/or organoleptic properties of the item 202.

Since the pulsed electrostatic field creates vibrations not only on the surface of the item 202 but also internally to prevent (or at least reduce) crystal growth, the destruction of the cells and/or structure of the item 202 may be prevented (or at least reduced) not only on the surface of the item 202 but also internally.

It takes time for water crystals to form in an item (such as the item 202) during the freezing process. As such, it is not necessary to continuously apply the pulsed electrostatic field to the item. Instead, the pulsed electrostatic field may be applied at certain intervals. The intervals may depend on the type of the item and different pulse frequencies and intensities of the electrostatic field may be used for different types of items. For example, for meat and fish, the pulsed electrostatic field may have a frequency of 300 kHz, a field strength of 80,000 volts per meter (V/m), a periodicity of 8 seconds, and a duration of exposure of 2 seconds. As another example, for ice cream, the pulsed electrostatic field may have a frequency of 48 kHz, a field strength of 80,000 V/m, a periodicity of 8 seconds, and a duration of exposure of 2 sec.

In some embodiments, the oscillations (vibrations) inside cells of an item resulting from application of a pulsed electrostatic field during the freezing process may increase heat exchange inside the item. The increased heat exchange may accelerate a phase transition (e.g., to a solid/frozen state) up to 30% compared to an otherwise equivalent freezing process that lacks application of a pulsed electrostatic field. This may positively affect not only the speed of freezing, but also its quality.

Figure 3:
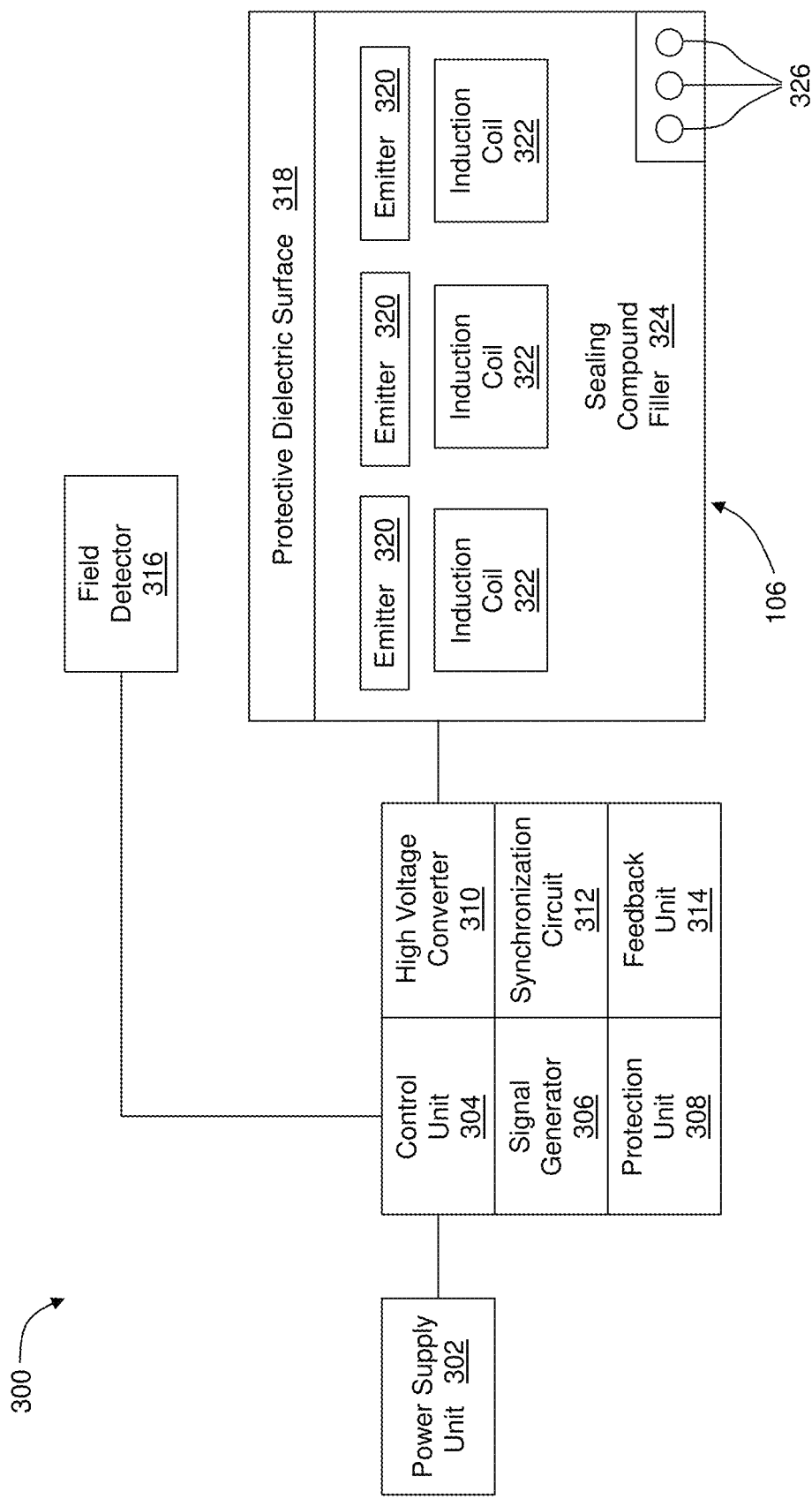
FIG. 3 is a block diagram of an example electrostatic system that may be implemented in the operating environment of FIG. 1, all arranged according to at least one embodiment of the present disclosure.

FIG. 3 is a block diagram of an example electrostatic system 300 (hereinafter "system 300") that may be implemented in the operating environment 100 of FIG. 1, arranged in accordance with at least one embodiment herein. The system 300 may include one or more modules 106 which may include, be included in, or otherwise correspond to any of the modules 106 of FIG. 1. The system 300 may additionally include electronics including one or more of a power supply unit 302, a control unit 304, a signal generator 306, a protection unit 308, a high voltage converter 310, a synchronization circuit 312, a feedback unit 314, and a field detector 316. Each of the modules 106 may include one or more of a protective dielectric surface 318, one or more emitters 320, one or more induction coils 322, a sealing compound filler 324, and one or more indicators 326.

The power supply unit 302 is supplied with an input mains voltage. The high voltage converter 310 may be mounted inside the module 106 or outside the module 106. In embodiments of the system 300 that include two or more modules 106, the modules 106 may be powered in parallel from the single high voltage converter 310 and the power supply unit 302.

The control unit 304 may be made as a controller and may be or include a processor and/or computer storage medium. The processor may be of any type such as a central processing unit (CPU), a microprocessor (μP), a microcontroller (μC), a digital signal processor (DSP), or any combination thereof. The processor may be configured to execute computer instructions that, when executed, cause the processor to perform or control performance of one or more of the operations described herein with respect to the system 300. The storage medium may include any non-transitory computer-readable medium, including volatile memory such as random access memory (RAM), persistent or non-volatile storage such as read only memory (ROM), electrically erasable and programmable ROM (EEPROM), compact disc-ROM (CD-ROM) or other optical disk storage, magnetic disk storage or other magnetic storage device, NAND flash memory or other solid state storage device, or other persistent or non-volatile computer storage medium. The storage medium may store computer instructions that may be executed by the processor to perform or control performance of one or more of the operations described herein with respect to the system 300

The signal generator 306 may be configured to specify characteristics of an electrostatic field (e.g., frequency, intensity, modulation). The signal generator 306 is connected to the control unit 304, to which, in turn, the induction coils 322 are connected as the electrostatic field generator.

The voltage of the high voltage converter 310 passes through the signal generator 306 and then to the electrostatic field generator, e.g., the induction coils 322. The induction coils 322 are mounted on the emitters 320, which are made as a radiator plate with recesses for placing the induction coils 322 in them. The recesses on the surface of the radiator plate may be placed evenly over the surface.

The induction coils 322 may be made of copper conductor.

The synchronization circuit 312 is made as an integrated circuit, and is a signal summator, which allows to synchronize operation of the emitters 320 across modules 106 when installing two or more modules 106.

The feedback unit 314 is an electronic circuit that continuously measures field parameters through the field detector 316 and regulates the performance and power of the induction coils 322 to maintain the specified field parameters via the signal generator 306.

The protection unit 308 is connected to the control unit 304. The protection unit 308 is implemented to protect the system 300 from exceeding parameters of field limits of operating modes of the module 106 or system 300 and/or from short circuit.

The operating modes of the module 106 or system 300 may be displayed or communicated via indicators 326, which may be three light emitting diodes (LEDs) in some embodiments. Each of the three LEDs may indicate a different one of three main parameters: power, the presence of radiation, and emergency lockout.

A housing of the module 106 may be filled inside with the sealing compound filler 324 for tightness and protection from moisture. The protective dielectric surface 318 may prevent the influence of external factors on the operating modes of the module 106. For example, the protective dielectric surface 318 may block an electrostatic field of an adjacent module 106 from influencing one or more items on or proximate to the module 106. The protective dielectric surface 318 may be made as a polymer dielectric plate of 5 millimeter (mm) or more thickness. The protective dielectric surface 318 may function as the surface (wall) of the housing of the module 106 from the side of the freezing working area.

The system 300 may be used as follows. In an example, one or more modules 106 are mounted inside the blast freezer 102 and one or more items (e.g., food products, biological samples, etc.) may be placed in, on, or proximal to each of the modules 106. The blast freezer 102 rapidly cools the items. The power supply unit 302 is supplied with AC mains input voltage, and the signal generator 306 sets the characteristics of the electrostatic field (frequency, intensity, modulation). The signal generator 306 receives voltage from the high voltage converter 310 and generates a signal with desired characteristics. This signal is supplied to the electrostatic field generator (emitters 320 and induction coils 322) which thereby generates the desired pulsed electrostatic field. The pulsed electrostatic field is applied to the items during the freezing process to improve the quality of the items. The control unit 304 may periodically or randomly control the other electronics of the system 300 to temporarily turn off the pulsed electrostatic field during the freezing process since the pulsed electrostatic field need not be applied during the entire freezing process. Alternatively or additionally, the control unit 304 may periodically or randomly control the other electronics of the system 300 to turn off the pulsed electrostatic field when the freezing process is complete.

The instant inventors have made an industrial mock-up of the disclosed invention (e.g., the system 300) and experimentally determined parameters of a pulsed electrostatic field (e.g., radiation power, frequency of signal generation) that may be used to preserve food or other items. Cooling was carried out by lowering the air temperature around freezing items to −24 to −40° C. by exposing the items to a flow of cold air created by fans and evaporators installed in a shock freezing chamber. The application of pulsed electrostatic fields during the freezing process as described herein was found to reduce the freezing time and increase the safety of the frozen items.

The manufactured industrial mock-up of the disclosed invention was tested to confirm the claimed technical result by conducting several similar experiments. During the experiments, two different versions of a system to freeze items were used. The first version was an experimental prototype sample that did not implement pulsed electrostatic fields as described herein. The second version was an experimental sample that implemented pulsed electrostatic fields as described herein, such as the system 300.

In an example experiment, an identical product—strawberries—of a non-fibrous structure with a high water content, was taken. The product was frozen in equal parts for a week in the first version and the second version. As already explained elsewhere herein, because of rapid freezing, the moisture in the product turns into crystals. To preserve the organoleptic characteristics (e.g., taste, color, smell, consistency, etc.) of the food product after defrosting, the crystals should be evenly spaced over the thickness of the product and not exceed the size of water molecules, namely 0.28 nanometers (nm). Thus, after natural defrosting of the product withdrawn from the first version of the system to freeze items, uneven formation of crystals exceeding the size of water molecules was observed, which led to changes in organoleptic parameters, specifically deterioration of taste, changes in color and odor compared with fresh product, and the consistency became shapeless, since the internal structure of the cells (fibers) of the product led to deformation. However, freezing strawberries in the second version of the system to freeze items eliminated the uneven formation of water crystals, and the size of the formed water crystals did not exceed 0.28 nm. Accordingly, the organoleptic parameters (e.g., taste, color, smell, and consistency) of defrosted strawberries from the second version were close to the original ones. The same experiment was performed on a marine fish trunk according to GOST 32366-2013. As a result, the preservation of organoleptic parameters (e.g., taste, color, smell, and consistency), when freezing in the second version of the system to freeze items, significantly exceeded the parameters when freezing in the first version of the system to freeze items.

Thus, it has been experimentally proved that embodiments herein have significant advantages over analogues, including the possibility of freezing the food products while preserving the quality by reducing the size of crystals formed therein.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions to achieve the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

Embodiments described herein may be implemented using computer-readable media for carrying or having computer-executable instructions or data structures stored thereon. Such computer-readable media may be any available media that may be accessed by a general-purpose or special-purpose computer. By way of example, such computer-readable media may include non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to freeze items, comprising:
   placing an item to be frozen in a freeze chamber of a blast freezer;
   freezing the item in the freeze chamber;
   applying a pulsed electrostatic field to the item for one or more time intervals while freezing the item in the freeze chamber; and
   in response to application of the pulsed electrostatic field to the item:
      alternately pulling positively charged particles within the item in a first direction and a second direction opposite to the first direction;
      alternately pulling negatively charged particles within the item in the second direction and the first direction; and
      alternately accumulating charges on a surface of the item opposite to the pulsed electrostatic field;
   wherein:
      applying the pulsed electrostatic field to the item includes alternately applying a first electrostatic field oriented in the first direction and a second electrostatic field oriented in the second direction to the item, the second direction being opposite to the first direction;
      alternately pulling the positively charged particles within the item in the first direction and the second direction comprises alternately pulling the positively-charged particles in the first direction in response to application of the first electrostatic field and in the second direction in response to application of the second electrostatic field;
      alternately pulling the negatively charged particles within the item in the second direction and the first direction comprises alternately pulling the negatively-charged particles within the item in the second direction in response to application of the first electrostatic field and in the first direction in response to application of the second electrostatic field; and
      alternately accumulating charges on the surface of the item opposite to the pulsed electrostatic field comprises alternately accumulating charges opposite to the first electrostatic field on the surface of the item in response to application of the first electrostatic field and charges opposite to the second electrostatic field on the surface of the item in response to application of the second electrostatic field, the accumulation of charges on the surface of the item in response to application of the second electrostatic field being opposite to the accumulation of charges on the surface of the item in response to application of the first electrostatic field.

2. The method of claim 1, wherein applying the pulsed electrostatic field to the item includes:
   supplying AC mains input voltage to a power supply unit;
   generating, in a high voltage converter, a converted voltage from the AC mains input voltage;
   setting characteristics of the pulsed electrostatic field in a signal generator;

generating, in the signal generator, a signal from the converted voltage based on the set characteristics; and generating, in one or more induction coils, the pulsed electrostatic field having the set characteristics using the signal from the signal generator.

3. The method of claim 2, wherein the characteristics of the pulsed electrostatic field include at least one of a frequency, intensity, or modulation of the pulsed electrostatic field.

4. The method of claim 1, wherein application of the pulsed electrostatic field while freezing the item in the freeze chamber limits a size of water crystals within the item to 0.28 nanometers or less.

5. The method of claim 1, wherein application of the pulsed electrostatic field while freezing the item in the freeze chamber preserves organoleptic properties of the item.

6. The method of claim 1, wherein the pulsed electrostatic field has at least one of:
- a voltage in a range from 1 kilovolt (kV) to 50 kV;
- a field strength in a range from 1,000 volts per meter (V/m) to 500,000 V/m;
- a pulse frequency in a range from 90 hertz (Hz) to 10,000 kilohertz (kHz);
- a periodicity in a range from 0.05 seconds to 10 seconds; and
- an intermittent duration of exposure of 10 microseconds to 5 seconds.

7. The method of claim 1, wherein the alternate pulling and accumulating imparts vibrations on and into the item to inhibit formation of ice crystals during the freezing.

8. The method of claim 1, further comprising creating vibrations on a surface of the item responsive to application of the pulsed electrostatic field to the item and transmitting the vibrations internally into the item.

9. The method of claim 8, further comprising the vibrations inhibiting formation of ice crystals within the item during the freezing.

10. A method to freeze items, comprising:
freezing an item in a freeze chamber of a blast freezer;
applying a pulsed electrostatic field to the item for one or more time intervals while freezing the item in the freeze chamber;
in response to application of the pulsed electrostatic field to the item:
alternately pulling positively charged particles within the item in a first direction and a second direction opposite to the first direction;
alternately pulling negatively charged particles within the item in the second direction and the first direction; and
alternately accumulating charges on a surface of the item opposite to the pulsed electrostatic field;
creating microscopic ultrasonic vibrations on the surface of the item in response to the alternate pulling and accumulating; and
transmitting the microscopic ultrasonic vibrations internally into the item to inhibit formation of ice crystals within the item during the freezing;
wherein:
applying the pulsed electrostatic field to the item includes alternately applying a first electrostatic field oriented in the first direction and a second electrostatic field oriented in the second direction to the item, the second direction being opposite to the first direction;
alternately pulling the positively charged particles within the item in the first direction and the second direction comprises alternately pulling the positively-charged particles in the first direction in response to application of the first electrostatic field and in the second direction in response to application of the second electrostatic field;
alternately pulling the negatively charged particles within the item in the second direction and the first direction comprises alternately pulling the negatively-charged particles within the item in the second direction in response to application of the first electrostatic field and in the first direction in response to application of the second electrostatic field; and
alternately accumulating charges on the surface of the item opposite to the pulsed electrostatic field comprises alternately accumulating charges opposite to the first electrostatic field on the surface of the item in response to application of the first electrostatic field and charges opposite to the second electrostatic field on the surface of the item in response to application of the second electrostatic field, the accumulation of charges on the surface of the item in response to application of the second electrostatic field being opposite to the accumulation of charges on the surface of the item in response to application of the first electrostatic field.

11. The method of claim 10, wherein the pulsed electrostatic field includes one or more characteristics including at least one of a voltage, a field strength, a pulse frequency, a periodicity, and an intermittent duration.

12. The method of claim 11, further comprising, prior to applying the pulsed electrostatic field, setting the one or more characteristics in dependence on a type of the item such that at least one of the one or more characteristics has a first value if the item is a first type of item or a different second value if the item is a second type of item different than the first type of item.

13. A system to freeze food products, comprising:
a control unit;
a power supply unit connected to the control unit;
a high voltage converter connected to the control unit and the power supply unit;
a signal generator connected to the control unit and the high voltage converter;
a field detector; and
an electrostatic module to apply a pulsed electrostatic field to food products, the module comprising one or more induction coils mounted to a radiator plate of one or more emitters;
wherein:
the electrostatic module is configured to apply the pulsed electrostatic field to the food products for one or more time intervals while the food products are being frozen in a freeze chamber of a blast freezer;
application of the pulsed electrostatic field to the food products is configured, for a given food product, to:
alternately pull positively charged particles within the given food product in a first direction and a second direction opposite to the first direction;
alternately pull negatively charged particles within the given food product in the second direction and the first direction; and
alternately accumulate charges on a surface of the given food product opposite to the pulsed electrostatic field;
applying the pulsed electrostatic field to the given food product includes alternately applying a first electrostatic field oriented in the first direction and a second electrostatic field oriented in the second direction to the given food product, the second direction being opposite to the first direction;

alternately pulling the positively charged particles within the given food product in the first direction and the second direction comprises alternately pulling the positively-charged particles in the first direction in response to application of the first electrostatic field and in the second direction in response to application of the second electrostatic field;

alternately pulling the negatively charged particles within the given food product in the second direction and the first direction comprises alternately pulling the negatively-charged particles within the given food product in the second direction in response to application of the first electrostatic field and in the first direction in response to application of the second electrostatic field; and alternately accumulating charges on the surface of the given food product opposite to the pulsed electrostatic field comprises alternately accumulating charges opposite to the first electrostatic field on the surface of the given food product in response to application of the first electrostatic field and charges opposite to the second electrostatic field on the surface of the given food product in response to application of the second electrostatic field, the accumulation of charges on the surface of the given food product in response to application of the second electrostatic field being opposite to the accumulation of charges on the surface of the given food product in response to application of the first electrostatic field.

14. The system of claim 13, wherein the electrostatic module further comprises a sealing compound filler for tightness and protection from moisture.

15. The system of claim 13, wherein the radiator plate comprises one or more recesses, each having therein a corresponding one of the one or more induction coils.

16. The system of claim 13, wherein the electrostatic module further comprises one or more indicators, each comprising a light emitting diode (LED).

17. The system of claim 13, further comprising the blast freezer having the freeze chamber within which the electrostatic module is disposed.

18. The system of claim 17, wherein the electrostatic module further comprises a protective dielectric surface to block an electrostatic field of a second electrostatic module adjacent to the electrostatic module, the protective dielectric surface comprising a polymer dielectric plate having a thickness of at least 5 millimeters.

* * * * *